United States Patent
Banka et al.

(10) Patent No.: US 10,148,665 B2
(45) Date of Patent: Dec. 4, 2018

(54) SELF-SERVICE ACQUISITION OF SUBSCRIPTIONS TO ONLINE SERVICES

(71) Applicant: Microsoft Technology Licensing, LLC, Redmond, WA (US)

(72) Inventors: Anjali Banka, Reston, VA (US); Brett E. Peters, Southborough, MA (US); Heng Ji, Woburn, MA (US); Jeffrey Lee James, Bothell, WA (US); Mochi Li, Kirkland, WA (US); Timothy H. Eshelman, Arlington, MA (US); Matthew Jay Kotler, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 268 days.

(21) Appl. No.: 15/150,820

(22) Filed: May 10, 2016

(65) Prior Publication Data
US 2017/0331825 A1 Nov. 16, 2017

(51) Int. Cl.
*G06F 21/10* (2013.01)
*H04M 3/42* (2006.01)
*H04L 29/06* (2006.01)

(52) U.S. Cl.
CPC ............ *H04L 63/102* (2013.01); *G06F 21/10* (2013.01); *G06F 21/105* (2013.01); *H04M 3/42153* (2013.01); *H04M 3/42161* (2013.01)

(58) Field of Classification Search
CPC .......... H04M 3/42153; H04M 3/42161; G06F 21/10; G06F 21/105
See application file for complete search history.

(56) References Cited

U.S. PATENT DOCUMENTS

| | | | |
|---|---|---|---|
| 8,832,851 B2 | 9/2014 | Li et al. | |
| 8,914,899 B2 | 12/2014 | Beckley et al. | |
| 9,173,090 B2 | 10/2015 | Tuchman et al. | |
| 9,715,581 B1 * | 7/2017 | Estes | G06Q 30/02 |
| 9,886,566 B2 * | 2/2018 | Bi | G06F 21/10 |
| 2002/0198843 A1 * | 12/2002 | Wang | G06F 21/10 705/51 |

(Continued)

OTHER PUBLICATIONS

Boussoualim, et al., "An Approach based on user preferences for selecting SaaS product", 2014 International Conference on Multimedia Computing and Systems (ICMCS), Apr. 14-16, 2014, pp. 1182-1188, Institute of Electrical and Electronics Engineers (IEEE).

(Continued)

*Primary Examiner* — Nelson Giddins (57) ABSTRACT

A provider of a subscription-based online service provides use of the online service to an end-user of an organization. A tenant account request is received from an administrator of the organization to establish a tenant account and authorize the end-user to acquire a subscription for the end-user to use the online service directly from the provider thereof. A subscription request is then received from the end-user to acquire the subscription for the end-user to use the online service. An individual license to use the online service is then assigned to the end-user, where this license allows just the end-user to access and use the online service. This individual license is then provided to the end-user.

6 Claims, 10 Drawing Sheets

(56) References Cited

U.S. PATENT DOCUMENTS

| | | | |
|---|---|---|---|
| 2004/0024688 A1* | 2/2004 | Bi | G06F 21/10 |
| | | | 705/37 |
| 2009/0138876 A1 | 5/2009 | Chang | |
| 2011/0093402 A1* | 4/2011 | Gupta | G06F 21/10 |
| | | | 705/317 |
| 2011/0131315 A1* | 6/2011 | Ferris | G06Q 30/0601 |
| | | | 709/224 |
| 2012/0041844 A1 | 2/2012 | Shen et al. | |
| 2012/0158580 A1* | 6/2012 | Eram | G06Q 20/10 |
| | | | 705/39 |
| 2013/0185807 A1* | 7/2013 | Rodriguez | G06F 21/10 |
| | | | 726/28 |
| 2015/0033359 A1* | 1/2015 | Lao | G06F 21/10 |
| | | | 726/26 |
| 2015/0039444 A1* | 2/2015 | Hardin | G06Q 30/0273 |
| | | | 705/14.69 |
| 2015/0178811 A1 | 6/2015 | Chen | |
| 2016/0132808 A1* | 5/2016 | To | G06Q 10/06315 |
| | | | 705/7.25 |
| 2016/0239675 A1* | 8/2016 | Tobkin | G06Q 30/0609 |
| 2017/0243216 A1* | 8/2017 | Kohn | G06Q 20/401 |
| 2017/0270495 A1* | 9/2017 | Hardin | G06Q 30/0273 |

OTHER PUBLICATIONS

Jayalatchumy, et al., "Preserving Privacy through Data Control in a Cloud Computing Architecture Using Discretion Algorithm", 2010 3rd International Conference on Emerging Trends in Engineering and Technology (ICETET), Nov. 19-21, 2010, pp. 456-461, Institute of Electrical and Electronics Engineers (IEEE).

* cited by examiner

SELF-SERVICE ACQUISITION OF SUBSCRIPTIONS TO ONLINE SERVICES

BACKGROUND

The Internet is a global data communications system that serves billions of users across the globe and provides them access to a vast array of online information resources and online services, including those provided by the World Wide Web, intranet-based organizations, and the like. Internet users spend a large and ever-increasing amount of time online. Thanks to the ubiquity of the Internet and the wide variety of network-enabled end-user computing devices that exist today, it is common for a given user to routinely use a variety of the online services that are available on the Internet. Generally speaking, the subscription model is a commercial model where an individual must acquire a subscription to a given product or service in order to be able to use the product or service, where the subscription provides the individual with access to the product or service for a defined period of time (e.g., a month, or a year). After this period of time expires the individual must re-acquire (e.g., renew) the subscription in order to regain access to the product or service. In the context of the Internet the subscription model is a commercial model where end-users must acquire a subscription to a given online service in order to be able to use the online service. Although the subscription model was originally pioneered by magazines and newspapers, in recent years it has become a popular way for online service providers to provide their online services to end-users.

SUMMARY

Subscription acquisition technique implementations described herein generally allow a provider of a subscription-based online service to provide use of the online service to an end-user of an organization. In one exemplary implementation a tenant account request is received from an administrator of the organization to establish a tenant account and authorize the end-user to acquire a subscription for the end-user to use the online service directly from the provider thereof. A subscription request is then received from the end-user to acquire the subscription for the end-user to use the online service. An individual license to use the online service is then assigned to the end-user, where this license allows just the end-user to access and use the online service. This individual license is then provided to the end-user.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more-detailed description that is presented below.

DESCRIPTION OF THE DRAWINGS

The specific features, aspects, and advantages of the subscription acquisition technique implementations described herein will become better understood with regard to the following description, appended claims, and accompanying drawings where:

DETAILED DESCRIPTION

In the following description of subscription acquisition technique implementations reference is made to the accompanying drawings which form a part hereof, and in which are shown, by way of illustration, specific implementations in which the subscription acquisition technique can be practiced. It is understood that other implementations can be utilized and structural changes can be made without departing from the scope of the subscription acquisition technique implementations.

It is also noted that for the sake of clarity specific terminology will be resorted to in describing the subscription acquisition technique implementations described herein and it is not intended for these implementations to be limited to the specific terms so chosen. Furthermore, it is to be understood that each specific term includes all its technical equivalents that operate in a broadly similar manner to achieve a similar purpose. Reference herein to "one implementation", or "another implementation", or an "exemplary implementation", or an "alternate implementation", or "one version", or "another version", or an "exemplary version", or an "alternate version" means that a particular feature, a particular structure, or particular characteristics described in connection with the implementation or version can be included in at least one implementation of the subscription acquisition technique. The appearances of the phrases "in one implementation", "in another implementation", "in an exemplary implementation", "in an alternate implementa-tion", "in one version", "in another version", "in an exemplary version", and "in an alternate version" in various places in the specification are not necessarily all referring to the same implementation or version, nor are separate or alternative implementations/versions mutually exclusive of other implementations/versions. Yet furthermore, the order of process flow representing one or more implementations or versions of the subscription acquisition technique does not inherently indicate any particular order nor imply any limitations of the subscription acquisition technique.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive, in a manner similar to the term "comprising", as an open transition word without precluding any additional or other elements.

1.0 Self-Service Acquisition of Subscriptions to Online Services

The subscription acquisition technique implementations described herein are generally applicable to the self-service acquisition of subscriptions to online services. In other words and as will be appreciated from the more-detailed description that follows, the subscription acquisition technique implementations generally allow a provider of a given subscription-based online service to provide the use of this online service to one or more end-users of an organization by utilizing a self-service licensing framework that enables each of the end-users to acquire a subscription to use the online service directly from the provider (e.g., the end-users do not have to go through an information technology (IT) administrator of the organization to acquire this subscription). The term "online service" is used herein to refer to a software-based service that end-users subscribe to over a data communication network via the aforementioned subscription model, and that provides one or more functions to the end-users. As such, the terms "online service" and "subscription-based online service" are interchangeable herein. The term "organization" is used herein to refer to a commercial enterprise, or a non-commercial enterprise, or the like.

The subscription acquisition technique implementations described herein are advantageous for various reasons including, but not limited to, the following. Conventional methods of providing end-users of an organization with subscriptions to a given online service involve a "top-down" licensing framework in which an IT administrator of the organization acquires the subscriptions to the online service from the provider thereof, and then individually distributes the associated licenses to each of the end-users. Since the subscription acquisition technique implementations utilize the aforementioned self-service licensing framework which is described in more detail hereafter, each of the end-users is able to quickly and easily acquire a subscription to use the online service directly from the provider thereof. As such, the subscription acquisition technique implementations greatly increase the speed at which the end-users are able to begin using the online service, thus increasing the productivity of the end-users.

Additionally, the subscription acquisition technique implementations described herein may be employed by any type of online service provider. The subscription acquisition technique implementations are also applicable to any type of online service. By way of example but not limitation, in tested implementations of the subscription acquisition technique described herein the subscription acquisition technique was employed to provide OFFICE 365™ (a trademark of Microsoft Corporation) subscriptions, Power BI subscriptions, Project subscriptions, and VISIO® (a registered trademark of Microsoft Corporation) subscriptions to the end-users of various organizations. Furthermore, besides supporting the situation where the end-users' organization includes an IT administrator so that the end-users operate as managed commercial tenants, the subscription acquisition technique implementations also support the situation where the end-users' organization does not include an IT administrator so that the end-users operate as unmanaged commercial tenants. The term "tenant" used herein is derived from the fact that an end-user who acquires a subscription to use an online service directly with the provider thereof is herein considered to be a tenant.

Figure 1:
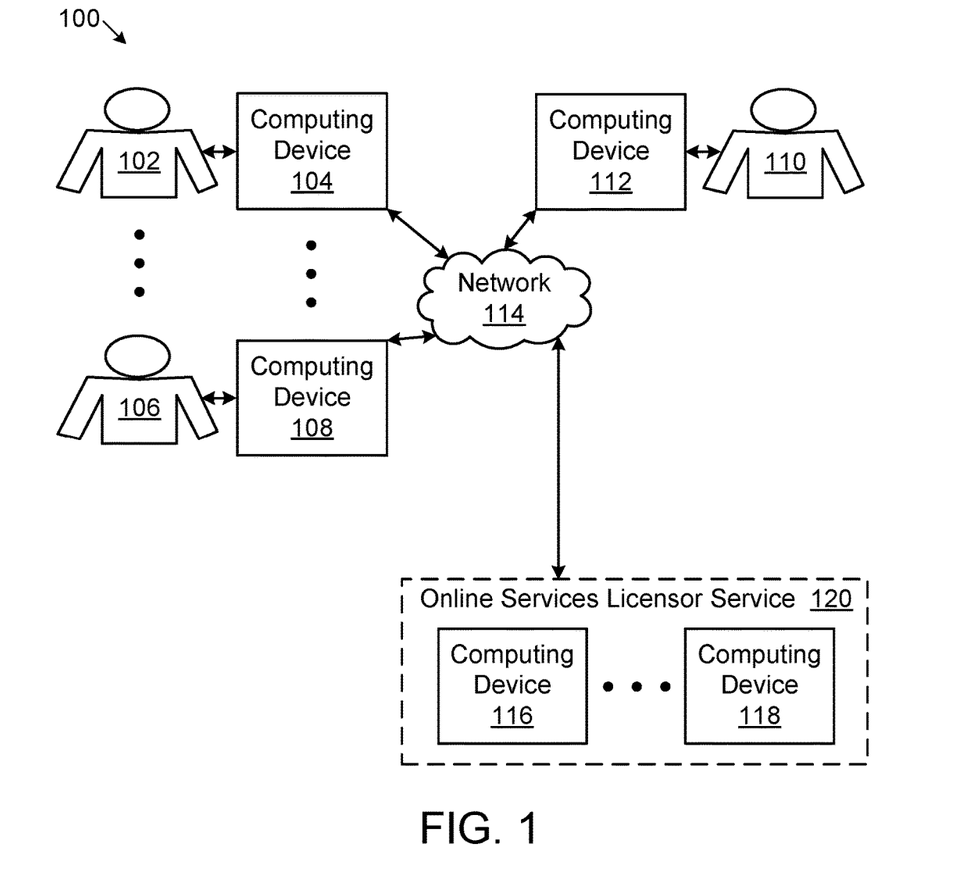
FIG. 1 is a diagram illustrating an exemplary implementation, in simplified form, of a system framework for realizing the subscription acquisition technique implementations described herein.

FIG. 1 illustrates an exemplary implementation, in simplified form, of a system framework for realizing the subscription acquisition technique implementations described herein. As exemplified in FIG. 1, the system framework 100 includes one or more end-user computing devices 104/108 each of which is utilized by a different end-user of an organization 102/106 to acquire a subscription to use, and then use, a given online service that is provided by a given provider of online services (not shown). In the just-described situation where the end-users' 102/106 organization includes an IT administrator 110, the system framework 100 will also include another end-user computing device 112 that is utilized by the organization's IT administrator 110 to perform various functions associated with the end-users' 102/106 acquisition of subscriptions to the online service. Exemplary functions that are performed by the IT administrator of the organization 110 are described in more detail hereafter. Each of the end-user computing devices 104/108/112 can be any type of conventional mobile computing device such as a smartphone, or a tablet computer, or a laptop computer (sometimes also referred to as a notebook or netbook computer), among other types of conventional mobile computing devices. Each of the end-user computing devices 104/108/112 can also be any type of conventional non-mobile computing device such as a desktop personal computer (PC), or a video game console, among other types of conventional non-mobile computing devices.

Referring again to FIG. 1, each of the end-user computing devices 104/108/112 is configured to communicate over a conventional data communication network 114 such as the Internet (among other types of conventional networks) with an online services licensor service 120 that is operated by the provider of online services and runs on one or more other computing devices 116/118. These other computing devices 116/118 can also communicate with each other via the network 114. In an exemplary implementation of the subscription acquisition technique described herein the other computing devices 116/118 are located in the cloud so that the licensor service 120 operates as a cloud service and the network 114 includes wide area network functionality. The term "cloud service" is used herein to refer to a World Wide Web application that operates in the cloud and can be hosted on (e.g., deployed at) a plurality of data centers that can be located in different geographic regions (e.g., different regions of the world). Generally speaking and as will be described in more detail hereafter, the licensor service 120 performs a variety of functions associated with the self-service acquisition of subscriptions to an online service that is provided by the provider of online services.

Figure 2:
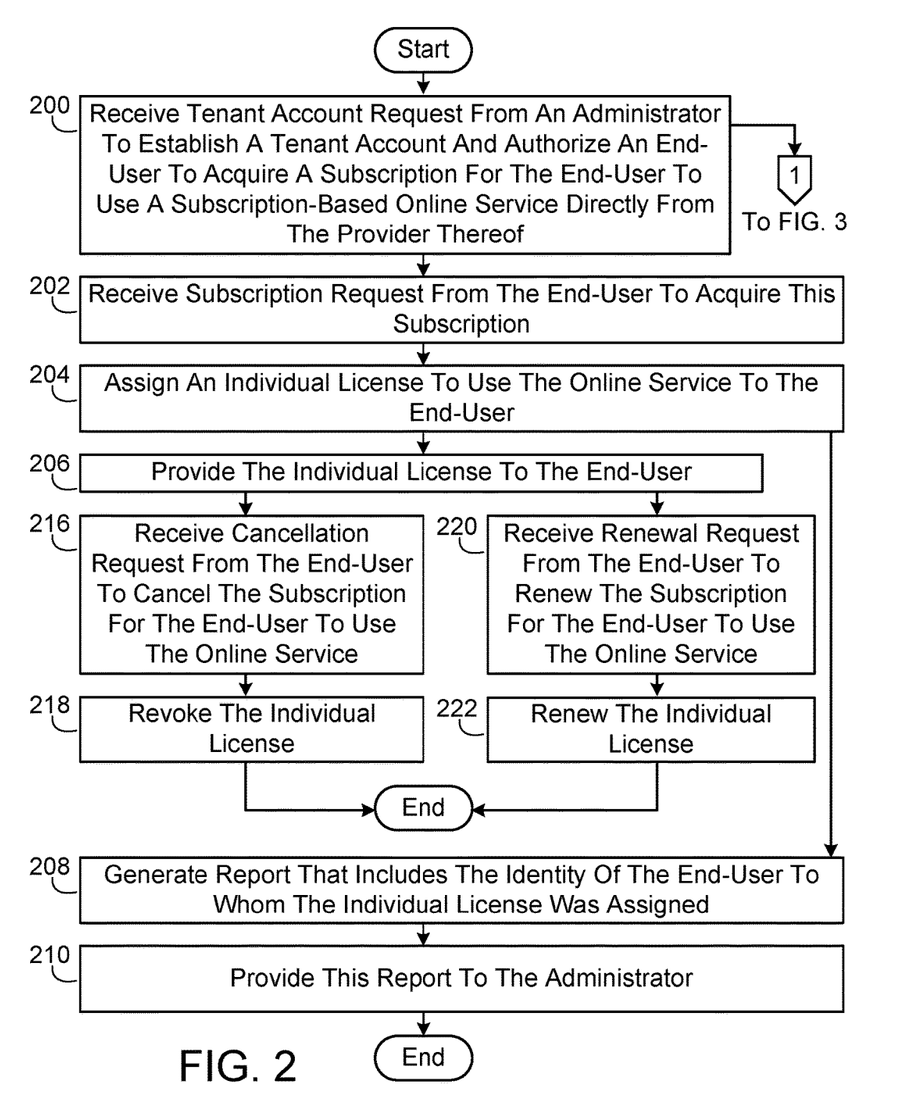
FIGS. 2 and 3 are a flow diagram illustrating one implementation, in simplified form, of a process for a provider of a subscription-based online service to provide use of this online service to an end-user of an organization.
Figure 3:
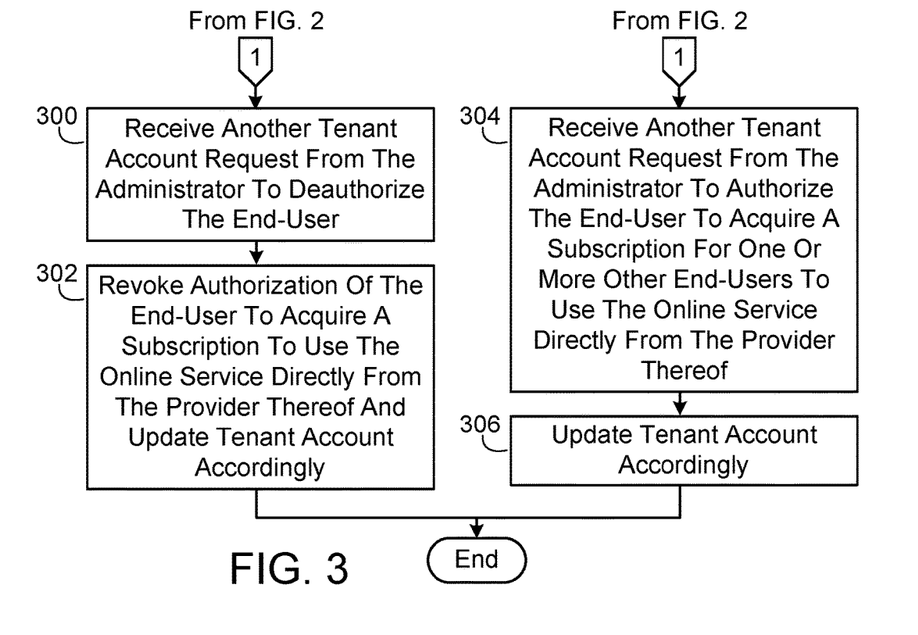

FIGS. 2 and 3 illustrate one implementation, in simplified form, of a process for a provider of a subscription-based online service to provide use of the online service to an end-user of an organization. As will be appreciated from the more-detailed description that follows, the process shown in FIGS. 2 and 3 may be employed in the situation where the organization includes an IT administrator. As exemplified in FIG. 2, the process starts with receiving a tenant account request from the administrator to establish a tenant account and authorize the end-user to acquire a subscription for the end-user to use the online service directly from the provider thereof (process action 200). A subscription request is then received from the end-user to acquire this subscription (process action 202). An individual license to use the online service is then assigned to the end-user (process action 204), where this license allows just the end-user to access and use the online service. The individual license is then provided to the end-user (process action 206). The term "individual license" is used herein to refer to a license that is intended for the use of just the end-user themselves.

Referring again to FIG. 2, after the individual license to use the subscription-based online service has been assigned to the end-user (action 204), a report that includes the identity of the end-user to whom this license was assigned may be generated (process action 208), and this report may then be provided to the IT administrator (process action 210). In addition to identifying the end-user to whom the individual license was assigned, the report can optionally also include the date, or the date and time, that the individual license was assigned to the end-user. The report can be generated in a variety of formats. By way of example but not limitation, in a tested implementation of the subscription acquisition technique described herein the report was generated in the form of a conventional comma-separated values (CSV) file which advantageously allows the report to be imported into a large number of different software applications for viewing or processing by the administrator. It will be appreciated that the report allows the administrator to easily determine how many subscriptions to use the online service have been acquired to date in the organization, and which of the organization's end-users have acquired these subscriptions.

Referring again to FIG. 2 and as exemplified in FIG. 3, any time after the end-user has been authorized to acquire a subscription for the end-user to use the subscription-based online service directly from the provider thereof (action 200), the IT administrator may submit another tenant account request to deauthorize the end-user. Upon receiving this particular tenant account request from the administrator (process action 300), the authorization of the end-user to acquire a subscription for the end-user to use the online service directly from the provider thereof will be revoked and the tenant account will be updated accordingly (process action 302). The administrator may also submit yet another tenant account request to authorize the end-user to acquire a subscription for one or more other end-users of the organization to use the online service directly from the provider thereof. Upon receiving this particular tenant account request from the administrator (process action 304), the tenant account will be updated accordingly (process action 306). Any time after the individual license to use the online service has been provided to the end-user (action 206), the end-user may submit a cancellation request to cancel the subscription for the end-user to use the online service. Upon receiving this cancellation request from the end-user (process action 216), the individual license that was assigned to the end-user will be revoked (process action 218).

Referring again to FIG. 2, in an exemplary implementation of the subscription acquisition technique implementations described herein the individual license to use the subscription-based online service that is provided to the end-user (action 206) may expire after a prescribed period of time has elapsed therefrom. In the case of such expiration the end-user can utilize the self-service licensing framework described herein to renew this individual license. More particularly, whenever the individual license to use the online service that was provided to the end-user expires, the end-user may submit a renewal request to renew the subscription for the end-user to use the online service. Upon receiving this renewal request from the end-user (process action 220), this individual license will be renewed (process action 222).

Figure 4:
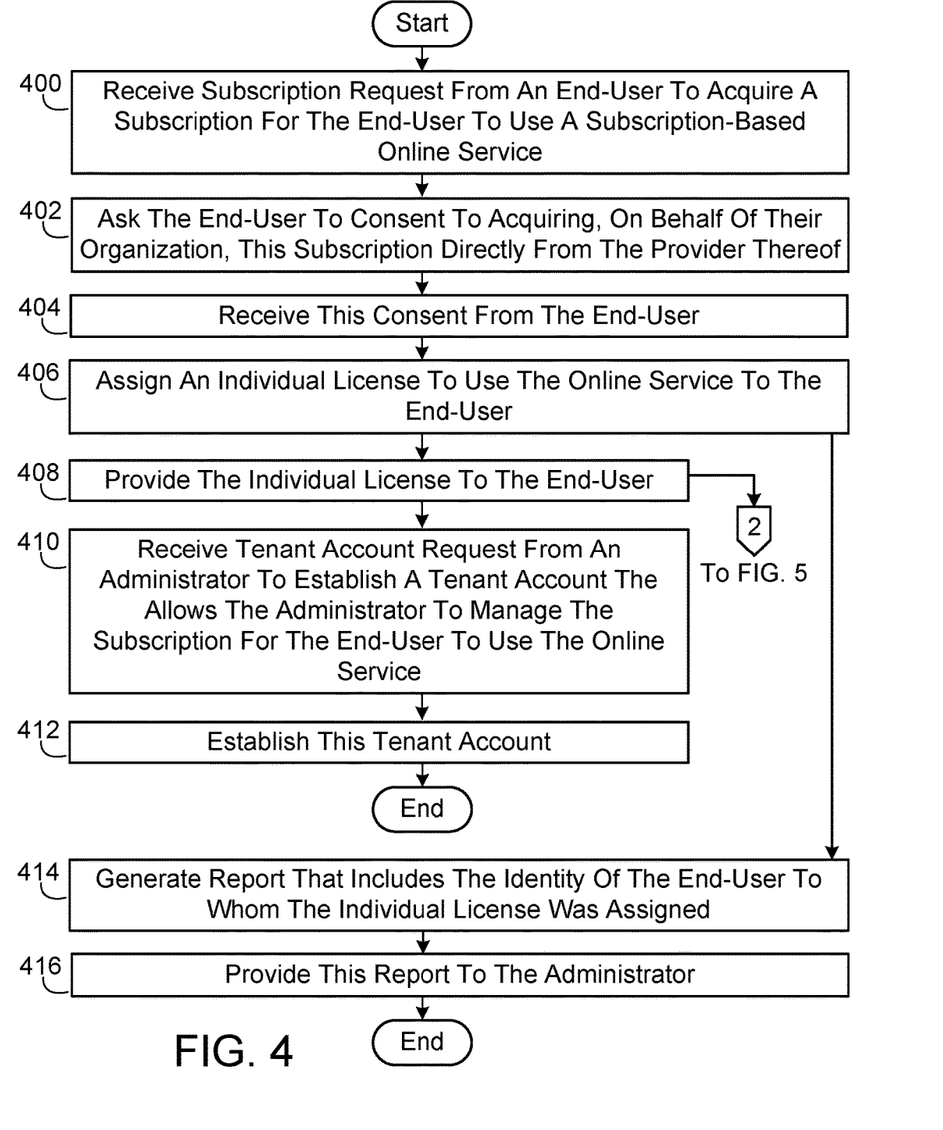
FIGS. 4 and 5 are a flow diagram illustrating another implementation, in simplified form, of a process for a provider of a subscription-based online service to provide use of this online service to an end-user of an organization.
Figure 5:
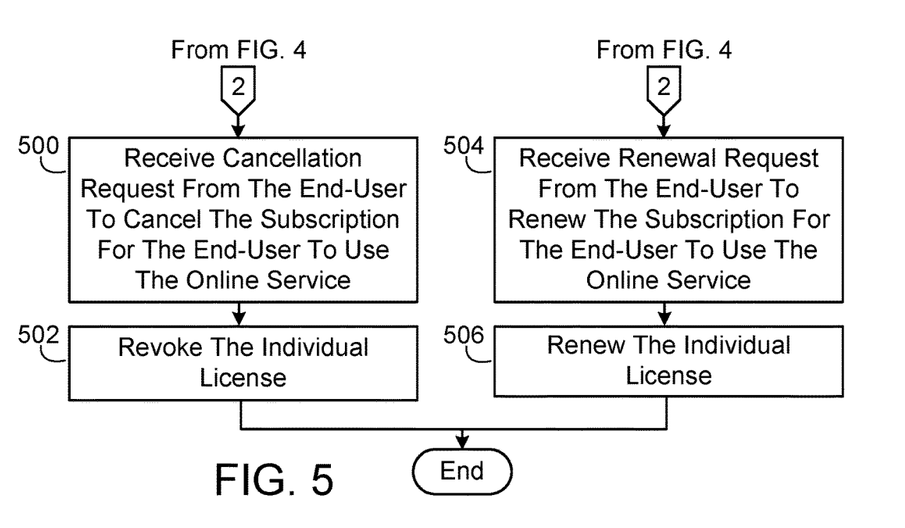

FIGS. 4 and 5 illustrate another implementation, in simplified form, of a process for a provider of a subscription-based online service to provide use of the online service to an end-user of an organization. As will be appreciated from the more-detailed description that follows, the process shown in FIGS. 4 and 5 may be employed in the situation where the organization does not include an IT administrator or in the situation where the organization does include an IT administrator. As exemplified in FIG. 4, the process starts with receiving a subscription request from the end-user to acquire a subscription for the end-user to use the online service (process action 400). The end-user is then asked to consent to acquiring, on behalf of the organization, this subscription directly from the provider thereof (process action 402). Upon receiving this consent from the end-user (process action 404), an individual license to use the online service is then assigned to the end-user (process action 406), where this license allows just the end-user to access and use the online service. The individual license is then provided to the end-user (process action 408).

Referring again to FIG. 4, in an exemplary implementation of the subscription acquisition technique described herein the just-described action of asking the end-user to consent to acquiring, on behalf of the organization, a subscription for the end-user to use the subscription-based online service directly from the provider thereof (action 402) may include the following actions. The end user may be asked to enter information specifying a physical address (e.g., a mailing address) for their organization. Upon receiving this physical address information from the user, it may be used to compute the tax that is related to this subscription acquisition.

Referring again to FIG. 4, any time after the individual license to use the subscription-based online service has been provided to the end-user (action 408), an IT administrator of the organization may submit a tenant account request to establish a tenant account that allows the administrator to manage the subscription for the end-user to use the online service. Upon receiving this tenant account request from the administrator (process action 410), the tenant account will be established (process action 412). After the individual license to use the online service has been assigned to the end-user (action 406), a report that includes the identity of the end-user to whom this license was assigned may be generated (process action 414), and this report may then be provided to the administrator (process action 416). Any time after the individual license to use the online service has been provided to the end-user (action 408), the end-user may submit a cancellation request to cancel the subscription for the end-user to use the online service. As exemplified in FIG. 5, upon receiving this cancellation request from the end-user (process action 500), the individual license that was assigned to the end-user will be revoked (process action 502). Whenever the individual license to use the online service that was provided to the end-user expires, the end-user may submit a renewal request to renew the subscription for the end-user to use the online service. Upon receiving this renewal request from the end-user (process action 504), this individual license will be renewed (process action 506).

Figure 6:
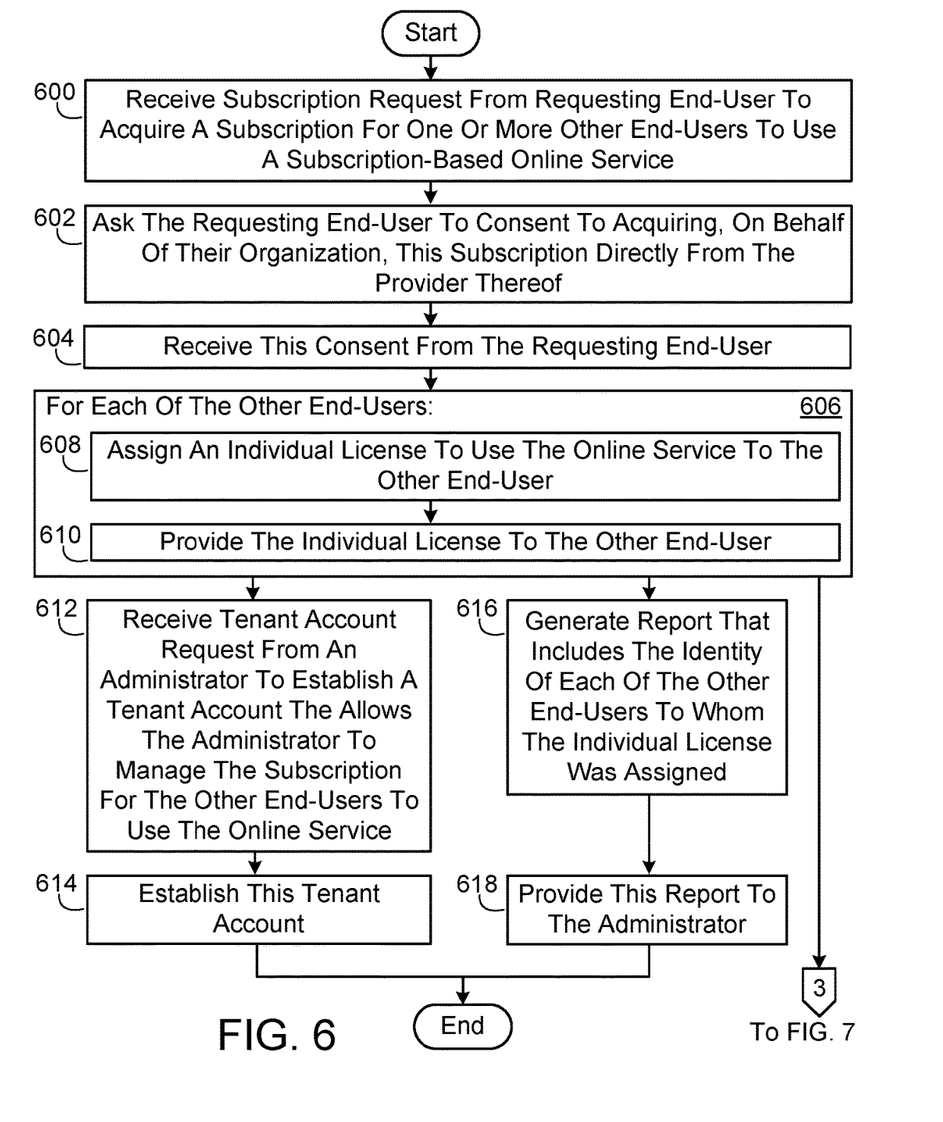
FIGS. 6 and 7 are a flow diagram illustrating an exemplary implementation, in simplified form, of a process for a provider of a subscription-based online service to provide use of this online service to one or more end-users of an organization.
Figure 7:
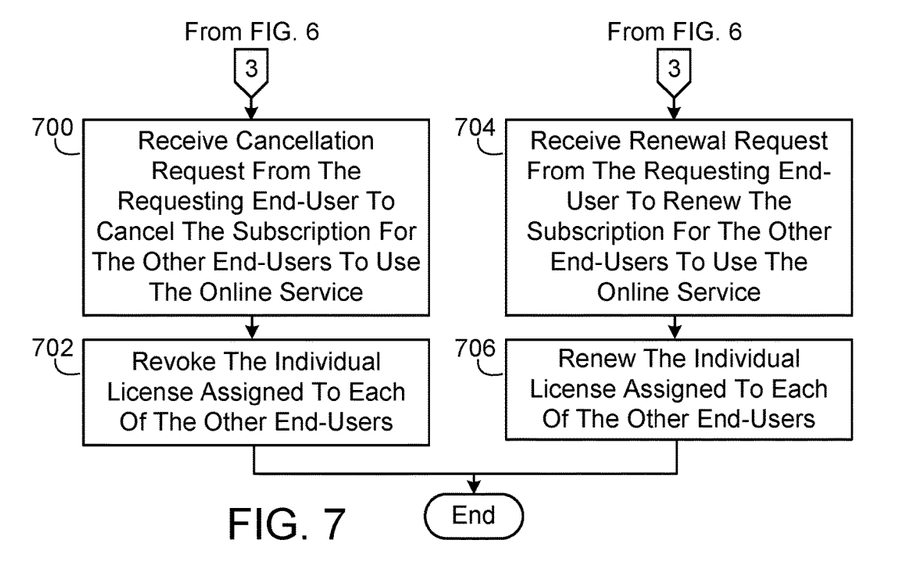

FIGS. 6 and 7 illustrate an exemplary implementation, in simplified form, of a process for a provider of a subscription-based online service to provide use of the online service to one or more end-users of an organization. As will be appreciated from the more-detailed description that follows, the process shown in FIGS. 6 and 7 may be employed in the situation where the organization does not include an IT administrator or in the situation where the organization does include an IT administrator. As exemplified in FIG. 6, the process starts with receiving a subscription request from a requesting end-user of the organization to acquire a subscription for one or more other end-users of the organization to use the online service (process action 600). In one implementation of the subscription acquisition technique described herein these other end-users of the organization are explicitly named in the subscription request. In another implementation of the subscription acquisition technique the subscription request specifies a team of end-users and these other end-users are part of this team. The requesting end-user is then asked to consent to acquiring, on behalf of the organization, the subscription for the other end-users of the organization to use the online service (process action 602). Upon receiving this consent from the requesting end-user (process action 604), the following actions occur for each of the other end-users (process action 606). An individual license to use the online service is assigned to the other end-user (process action 608), where this individual license allows just the other end-user to access and use the online service. The individual license is then provided to the other end-user (process action 610).

Referring again to FIG. 6, any time after the individual license to use the subscription-based online service has been assigned and provided to each of the other end-users (action 606), an IT administrator of the organization may submit a tenant account request to establish a tenant account that allows the administrator to manage the subscription for the other end-users to use the online service. Upon receiving this tenant account request from the administrator (process action 612), the tenant account will be established (process action 614). It is noted that in the case where the one or more other end-users of the organization include a plurality of other end-users of the organization, the tenant account will consolidate the individual licenses that are assigned and provided to each of the other end-users, and allow the administrator to manage these individual licenses. A report that includes the identity of each of the other end-users to whom the individual license to use the online service was assigned may also be generated (process action 616), and this report may then be provided to the administrator (process action 618). As exemplified in FIG. 7, the requesting end-user may also submit a cancellation request to cancel the subscription for the other end-users to use the online service. Upon receiving this cancellation request from the requesting end-user (process action 700), the individual license that was assigned to each of the other end-users will be revoked (process action 702).

Referring again to FIGS. 6 and 7, in an exemplary implementation of the subscription acquisition technique implementations described herein the individual license to use the online service that assigned to each of the other end-users may expire after a prescribed period of time has elapsed from when this individual license was provided to each of the other end-users (action 606). In the case of such expiration the requesting end-user can utilize the self-service licensing framework described herein to renew these individual licenses. More particularly, whenever the individual license to use the online service that was provided to each of the other end-users expires, the requesting end-user may submit a renewal request to renew the subscription for the other end-users to use the online service. Upon receiving this renewal request from the requesting end-user (process action 704), the individual license assigned to each of the other end-users will be renewed (process action 706).

Figure 8:
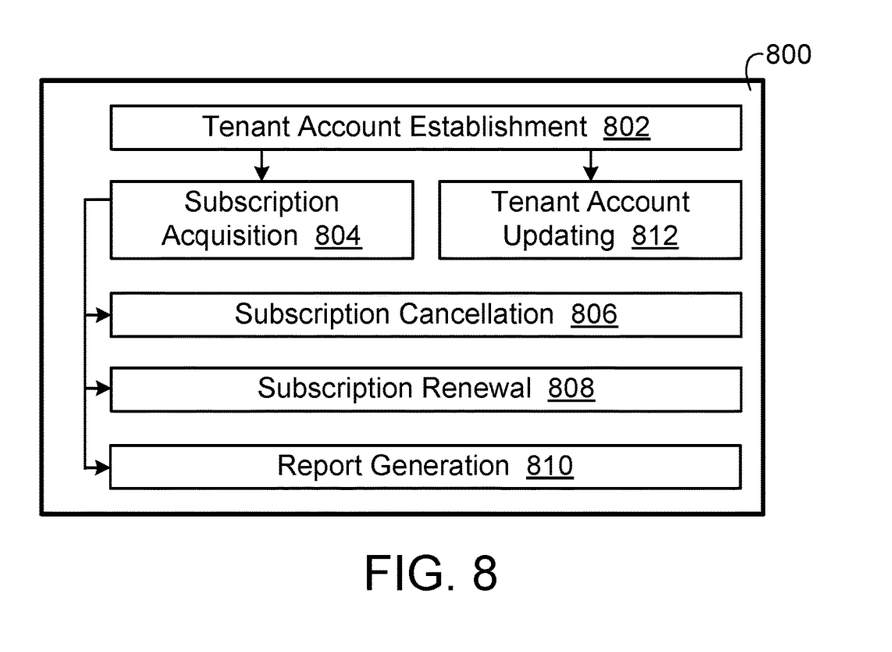
FIG. 8 is a diagram illustrating one implementation, in simplified form, of an online services licensor computer program for a provider of a subscription-based online service to provide use of the online service to one or more end-users of an organization.

FIG. 8 illustrates one implementation, in simplified form, of an online services licensor computer program for a provider of a subscription-based online service to provide use of the online service to one or more end-users of an organization. As exemplified in FIG. 8 and referring again to FIGS. 2-3, the online services licensor computer program 800 includes, but is not limited to, a tenant account establishment sub-program 802 that performs action 200, a subscription acquisition sub-program 804 that performs actions 202, 204 and 206, a subscription cancellation sub-program 806 that performs actions 216 and 218, a subscription renewal sub-program 808 that performs actions 220 and 222, a report generation sub-program 810 that performs actions 208 and 210, and a tenant account updating sub-program 812 that performs actions 300, 302, 304 and 306.

Figure 9:
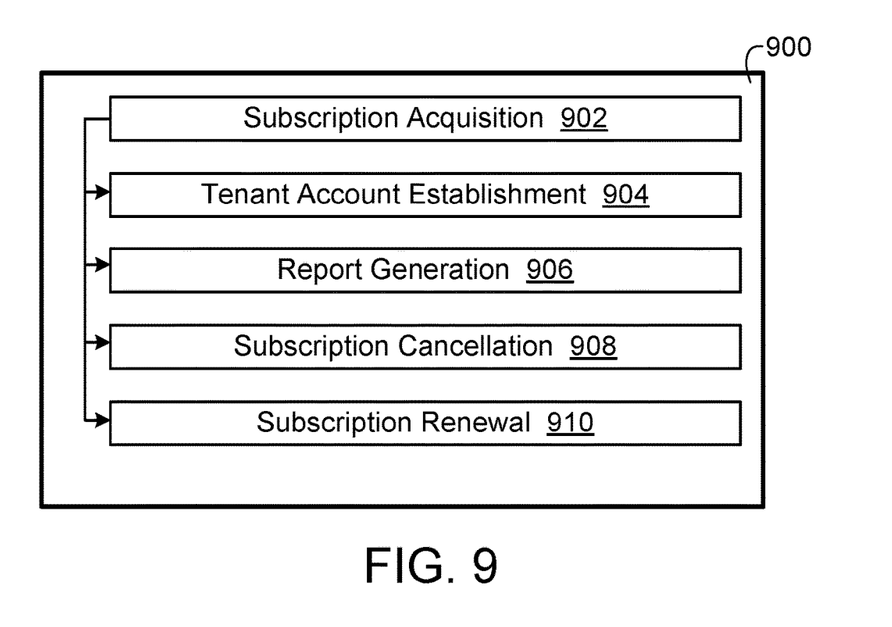
FIG. 9 is a diagram illustrating another implementation, in simplified form, of an online services licensor computer program for a provider of a subscription-based online service to provide use of the online service to one or more end-users of an organization.

FIG. 9 illustrates another implementation, in simplified form, of an online services licensor computer program for a provider of a subscription-based online service to provide use of the online service to one or more end-users of an organization. As exemplified in FIG. 9 and referring again to FIGS. 4-5, the online services licensor computer program 900 includes, but is not limited to, a subscription acquisition sub-program 902 that performs actions 400, 402, 404, 406 and 408, a tenant account establishment sub-program 904 that performs actions 410 and 412, a report generation sub-program 906 that performs actions 414 and 416, a subscription cancellation sub-program 908 that performs actions 500 and 502, and a subscription renewal sub-program 910 that performs actions 504 and 506.

Figure 10:
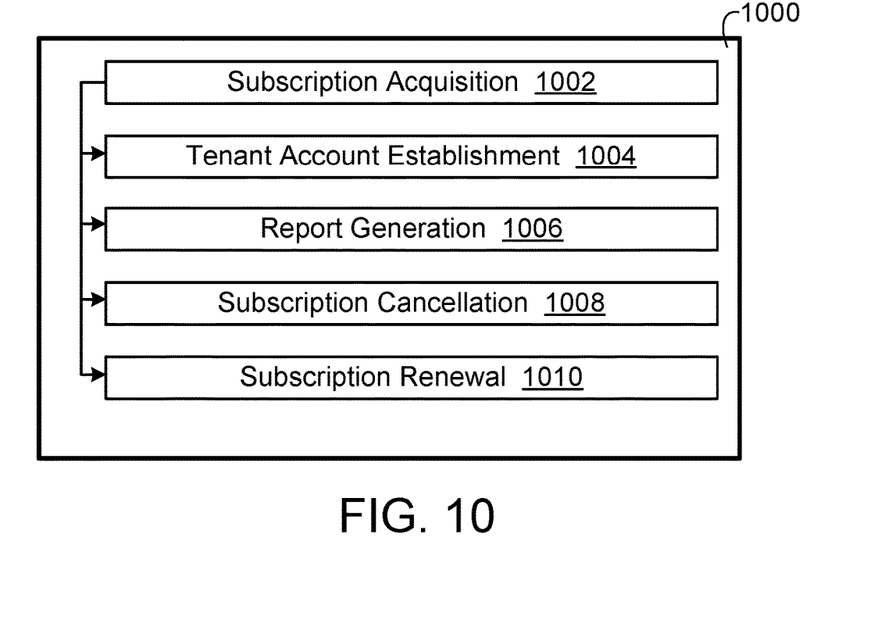
FIG. 10 is a diagram illustrating yet another implementation, in simplified form, of an online services licensor computer program for a provider of a subscription-based online service to provide use of the online service to one or more end-users of an organization.

FIG. 10 illustrates yet another implementation, in simplified form, of an online services licensor computer program for a provider of a subscription-based online service to provide use of the online service to one or more end-users of an organization. As exemplified in FIG. 10 and referring again to FIGS. 6-7, the online services licensor computer program 1000 includes, but is not limited to, a subscription acquisition sub-program 1002 that performs actions 600, 602, 604, and 606, a tenant account establishment sub-program 1004 that performs actions 612 and 614, a report generation sub-program 1006 that performs actions 616 and 618, a subscription cancellation sub-program 1008 that performs actions 700 and 702, and a subscription renewal sub-program 1010 that performs actions 704 and 706.

2.0 Other Implementations

While the subscription acquisition technique has been described by specific reference to implementations thereof, it is understood that variations and modifications thereof can be made without departing from the true spirit and scope of the subscription acquisition technique. It is noted that any or all of the aforementioned implementations throughout the description may be used in any combination desired to form additional hybrid implementations. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

3.0 Exemplary Operating Environments

Figure 11:
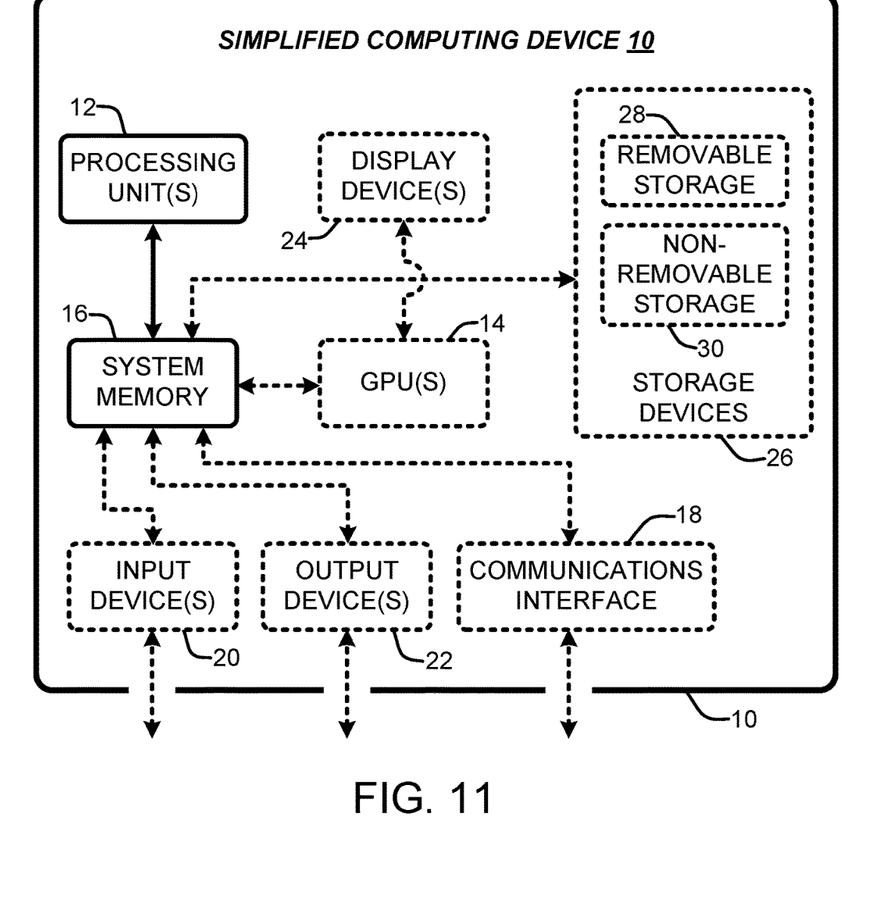
FIG. 11 is a diagram illustrating a simplified example of a general-purpose computer system on which various implementations and elements of the subscription acquisition technique, as described herein, may be realized.

The subscription acquisition technique implementations described herein are operational within numerous types of general purpose or special purpose computing system environments or configurations. FIG. 11 illustrates a simplified example of a general-purpose computer system on which various implementations and elements of the subscription acquisition technique, as described herein, may be implemented. It is noted that any boxes that are represented by broken or dashed lines in the simplified computing device 10 shown in FIG. 11 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the subscription acquisition technique implementations described herein, the device should have a sufficient computational capability and system memory to enable basic computational operations. In particular, the computational capability of the simplified computing device 10 shown in FIG. 11 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of the subscription acquisition technique implementations described herein, including input, output, control, feedback, and response to one or more users or other devices or systems associated with the subscription acquisition technique implementations, are enabled by a variety of Natural User Interface (NUI) scenarios. The NUI techniques and scenarios enabled by the subscription acquisition technique implementations include, but are not limited to, interface technologies that allow one or more users user to interact with the subscription acquisition technique implementations in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors (e.g., speech and/or voice recognition). Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the subscription acquisition technique implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the subscription acquisition technique implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 11 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, programs, sub-programs, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, programs, sub-programs, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, sub-programs, and/or computer program products embodying some or all of the various subscription acquisition technique implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The subscription acquisition technique implementations described herein may be further described in the general context of computer-executable instructions, such as programs, sub-programs, being executed by a computing device. Generally, sub-programs include routines, programs, objects, components, data structures, and the like, that perform particular tasks or implement particular abstract data types. The subscription acquisition technique implementations may also be practiced in distributed computing environments where tasks are performed by one or more remote processing devices, or within a cloud of one or more devices, that are linked through one or more communications networks. In a distributed computing environment, sub-programs may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include FPGAs, application-specific integrated circuits (ASICs), application-specific standard products (ASSPs), system-on-a-chip systems (SOCs), complex programmable logic devices (CPLDs), and so on.

4.0 Claim Support and Further Implementations

The following paragraphs summarize various examples of implementations which may be claimed in the present document. However, it should be understood that the implementations summarized below are not intended to limit the subject matter which may be claimed in view of the foregoing descriptions. Further, any or all of the implementations summarized below may be claimed in any desired combination with some or all of the implementations described throughout the foregoing description and any implementations illustrated in one or more of the figures, and any other implementations described below. In addition, it should be noted that the following implementations are intended to be understood in view of the foregoing description and figures described throughout this document.

In one implementation, a first system is employed for a provider of a subscription-based online service to provide use of the online service to an end-user of an organization. This first system includes a first online services licensor that includes one or more computing devices, these computing devices being in communication with each other via a computer network whenever there is a plurality of computing devices, and a computer program having a plurality of sub-programs executable by these computing devices, wherein the sub-programs configure these computing devices to, receive a tenant account request from an administrator of the organization to establish a tenant account and authorize the end-user to acquire a subscription for the end-user to use the online service directly from the provider thereof, receive a subscription request from the end-user to acquire the subscription for the end-user to use the online service, assign an individual license to use the online service to the end-user, the license allowing just the end-user to access and use the online service, and provide the license to the end-user.

In one implementation of the just-described first system, the sub-programs of the computer program further configure the computing devices to: generate a report that includes the identity of the end-user to whom the license was assigned; and provide the report to the administrator. In one version of this particular implementation the report further includes one of: the date that the license was assigned to the end-user; or the date and time that the license was assigned to the end-user. In another version the report is generated in the form of a comma-separated values file.

In another implementation of the first system the sub-programs of the computer program further configure the computing devices to: receive another tenant account request from the administrator to deauthorize the end-user; and revoke the authorization of the end-user to acquire a subscription for the end-user to use the online service directly from the provider thereof and update the tenant account accordingly. In another implementation the sub-programs of the computer program further configure the computing devices to: receive a cancellation request from the end-user to cancel the subscription for the end-user to use the online service; and revoke the license. In another implementation the license expires after a prescribed period of time has elapsed from when the license was provided to the end-user, and the sub-programs of the computer program further configure the computing devices to: receive a renewal request from the end-user to renew the subscription for the end-user to use the online service; and renew the license. In another implementation the sub-programs of the computer program further configure the computing devices to: receive another tenant account request from the administrator to authorize the end-user to acquire a subscription for one or more other end-users of the organization to use the online service directly from the provider thereof; and update the tenant account accordingly.

In another implementation, a second system is employed for a provider of a subscription-based online service to provide use of the online service to an end-user of an organization. This second system includes a second online services licensor that includes one or more computing devices, these computing devices being in communication with each other via a computer network whenever there is a plurality of computing devices, and a computer program having a plurality of sub-programs executable by these computing devices, wherein the sub-programs configure these computing devices to, receive a subscription request from the end-user to acquire a subscription for the end-user to use the online service, ask the end-user to consent to acquiring, on behalf of the organization, the subscription for the end-user to use the online service directly from the provider thereof, receive this consent from the end-user, assign an individual license to use the online service to the end-user, the license allowing just the end-user to access and use the online service, and provide the license to the end-user.

In one implementation of the just-described second system, the sub-program for asking the end-user to consent to acquiring, on behalf of the organization, the subscription for the end-user to use the online service directly from the provider thereof includes sub-programs for: asking the end-user to enter information specifying a physical address for the organization; receiving this physical address information from the user; and using this physical address information to compute a tax related to this subscription acquisition. In another implementation the sub-programs of the computer program further configure the computing devices to: receive a tenant account request from an administrator of the organization to establish a tenant account that allows the administrator to manage the subscription for the end-user to use the online service; and establish this tenant account. In another implementation the sub-programs of the computer program further configure the computing devices to: generate a report that includes the identity of the end-user to whom the license was assigned; and provide the report to an administrator of the organization.

In another implementation of the second system the sub-programs of the computer program further configure the computing devices to: receive a cancellation request from the end-user to cancel the subscription for the end-user to use the online service; and revoke the license. In another implementation the license expires after a prescribed period of time has elapsed from when the license was provided to the end-user, and the sub-programs of the computer program further configure the computing devices to: receive a renewal request from the end-user to renew the subscription for the end-user to use the online service; and renew the license.

In another implementation, a third system is employed for a provider of a subscription-based online service to provide use of the online service to one or more end-users of an organization. This third system includes a third online services licensor that includes one or more computing devices, these computing devices being in communication with each other via a computer network whenever there is a plurality of computing devices, and a computer program having a plurality of sub-programs executable by these computing devices, wherein the sub-programs configure these computing devices to, receive a subscription request from a requesting end-user of the organization to acquire a subscription for one or more other end-users of the organization to use the online service, ask the requesting end-user to consent to acquiring, on behalf of the organization, the subscription for the other end-users to use the online service directly from the provider thereof, receive this consent from the requesting end-user, and for each of the other end-users, assign an individual license to use the online service to the other end-user, the individual license allowing just the other end-user to access and use the online service, and provide the individual license to the other end-user.

In one implementation of the just-described third system, the sub-programs of the computer program further configure the computing devices to: receive a tenant account request from an administrator of the organization to establish a tenant account that allows the administrator to manage the subscription for the other end-users to use the online service; and establish this tenant account. In another implementation the sub-programs of the computer program further configure the computing devices to: generate a report that includes the identity of each of the other end-users to whom the individual license was assigned; and provide the report to an administrator of the organization. In another implementation the sub-programs of the computer program further configure the computing devices to: receive another subscription request from the requesting end-user to acquire a subscription for the requesting end-user to use the online service, ask the requesting end-user to consent to acquiring, on behalf of the organization, the subscription for the requesting end-user to use the online service directly from the provider thereof, receive this consent from the requesting end-user, assign another individual license to use the online service to the requesting end-user, this other individual license allowing just the requesting end-user to access and use the online service, and provide this other individual license to the requesting end-user.

In another implementation of the third system the sub-programs of the computer program further configure the computing devices to: receive a cancellation request from the requesting end-user to cancel the subscription for the other end-users to use the online service; and revoke the individual license to use the online service assigned to each of the other end-users. In another implementation the individual license to use the online service assigned to each of the other end-users expires after a prescribed period of time has elapsed from when this individual license was provided to each of the other end-users, and the sub-programs of the computer program further configure the computing devices to: receive a renewal request from the requesting end-user to renew the subscription for the other end-users to use the online service; and renew this individual license assigned to each of the other end-users.

Wherefore, what is claimed is:

1. A system for a provider of a subscription-based online service to provide use of the online service to an end-user of a separate organization associated with the end-user, comprising:
    an online services licensor comprising one or more computing devices, said computing devices being in communication with each other via a computer network whenever there is a plurality of computing devices, and a computer program having a plurality of sub-programs executable by said computing devices, wherein the sub-programs configure said computing devices to,
    receive a subscription request from the end-user to acquire a subscription for the end-user to use the online service,
    ask the end-user to consent to acquiring the subscription, on behalf of the separate organization associated with the end-user, by entering a physical address for the separate organization,
    receive said physical address for the separate organization from the end-user,
    assign an individual license to use the online service to the end-user, said license allowing just the end-user to access and use the online service, and
    provide said license to the end-user.

2. The system of claim 1, wherein the sub-programs of the computer program further configure said computing devices to:
    receive a tenant account request from an administrator of the organization to establish a tenant account that allows the administrator to manage the subscription for the end-user to use the online service; and
    establish said tenant account.

3. The system of claim 1, wherein the sub-programs of the computer program further configure said computing devices to:
    generate a report comprising the identity of the end-user to whom said license was assigned; and
    provide the report to an administrator of the organization.

4. The system of claim 1, wherein the sub-programs of the computer program further configure said computing devices to:
    receive a cancellation request from the end-user to cancel the subscription for the end-user to use the online service; and
    revoke said license.

5. The system of claim 1, wherein said license expires after a prescribed period of time has elapsed from when said license was provided to the end-user, and the sub-programs of the computer program further configure said computing devices to:
    receive a renewal request from the end-user to renew the subscription for the end-user to use the online service; and
    renew said license.

6. The system of claim 1, wherein the physical address for the separate organization is used to compute a tax related to the subscription.

* * * * *